United States Patent
Kallman et al.

[11] Patent Number: 5,838,740
[45] Date of Patent: Nov. 17, 1998

[54] CROSSPOLE INTERFERENCE CANCELING RECEIVER FOR SIGNALS WITH UNRELATED BAUD RATES

[75] Inventors: Kurt Albert Kallman, Mesa; Randy Lee Turcotte, Tempe, both of Ariz.

[73] Assignee: Motorola, Inc., Schaumburg, Ill.

[21] Appl. No.: 633,636

[22] Filed: Apr. 17, 1996

[51] Int. Cl.⁶ .................................................. H04B 1/10
[52] U.S. Cl. ..................... 375/346; 375/349; 342/362; 455/295; 455/296
[58] Field of Search ...................... 375/234, 235, 375/346, 347, 349, 350; 342/361, 362; 455/295, 296, 307

[56] References Cited

U.S. PATENT DOCUMENTS

| | | | |
|---|---|---|---|
| 4,577,330 | 3/1986 | Kavehrad | 375/235 |
| 4,606,054 | 8/1986 | Amitay et al. | 375/349 |
| 4,635,276 | 1/1987 | Karabinis | 375/235 |
| 4,910,468 | 3/1990 | Ohtsuka et al. | 329/316 |
| 4,914,676 | 4/1990 | Iwamatsu et al. | 375/349 |
| 5,406,589 | 4/1995 | Iwamatsu et al. | 375/349 |
| 5,432,522 | 7/1995 | Kurokami | 342/361 |

*Primary Examiner*—Young T. Tse
*Attorney, Agent, or Firm*—Gregory J. Gorrie

[57] ABSTRACT

Crosspolarized signals of unrelated baud rates transmitted through a communication channel (10) become depolarized due to channel distortions such as rain and antenna imperfections. The resulting interference is canceled in a Modified Adaptive Crosspole Interference Canceler (MAXPIC) receiver (50, 70) by adjustment the timing in the crosspolarization path to compensate for the differential delay. Near equivalent bit error rate (BER) performance is achieved for systems utilizing crosspolarized signals with independent baud rates. In one embodiment, the receiver uses a fractionally spaced finite impulse response (FIR) filter (78) that operates at an integer multiple of the direct channel signal baud rate. In another embodiment, a variable delay (54) is used to time-align the received crosspolarized channel signal with the crosspolarization interference contained in the received direct signal.

20 Claims, 4 Drawing Sheets

CROSSPOLE INTERFERENCE CANCELING RECEIVER FOR SIGNALS WITH UNRELATED BAUD RATES

FIELD OF THE INVENTION

This invention relates in general to the field of radio frequency communications, in particular to communication systems that use crosspolarized signals and more particularly to receivers that cancel interference in crosspolarized signals.

BACKGROUND OF THE INVENTION

In communication systems, the transmission of crosspolarized signals allows for more efficient utilization of system bandwidth, essentially doubling a channel's throughput. Crosspolarized signals, for example, includes signals with two or more orthogonal electromagnetic waves. Unfortunately, rain and antenna imperfections, for example cause the received signals to become depolarized resulting in crosspolarization interference. This crosspolarization interference is a result of the coupling of signal of one polarization (the crosspolarized signal) into a signal of the opposite polarization (the direct channel signal). To reduce this interference, receivers have typically used adaptive crosspole interference cancellation techniques which are generally only suitable when the information bearing signals of the two polarizations have the same baud rate.

An important aspect of these interference cancellation techniques is the implementation of equalization and crosspole type filter structures. These filter structures are typically based on the baud rate interval of the direct channel signal. However, when the baud rate of the crosspolarized signal is not coherent with the rate of the direct channel signal, typical adaptive crosspole interference cancellation techniques are not capable of removing the crosspole interference.

Thus what is needed are an improved method and apparatus that cancels interference in crosspolarized signals. What is also needed are a method and apparatus that cancels interference in crosspolarized signals when the information bearing signals of the two polarizations have different baud rates.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a receiver and method that removes crosspole interference when the information bearing signals of the two polarizations have different baud rates. The present invention also provides a receiver and method that adjusts the timing in the crosspolarization path enabling cancellation of crosspolarization interference. The preferred embodiments of the present invention are described below.

Figure 1:
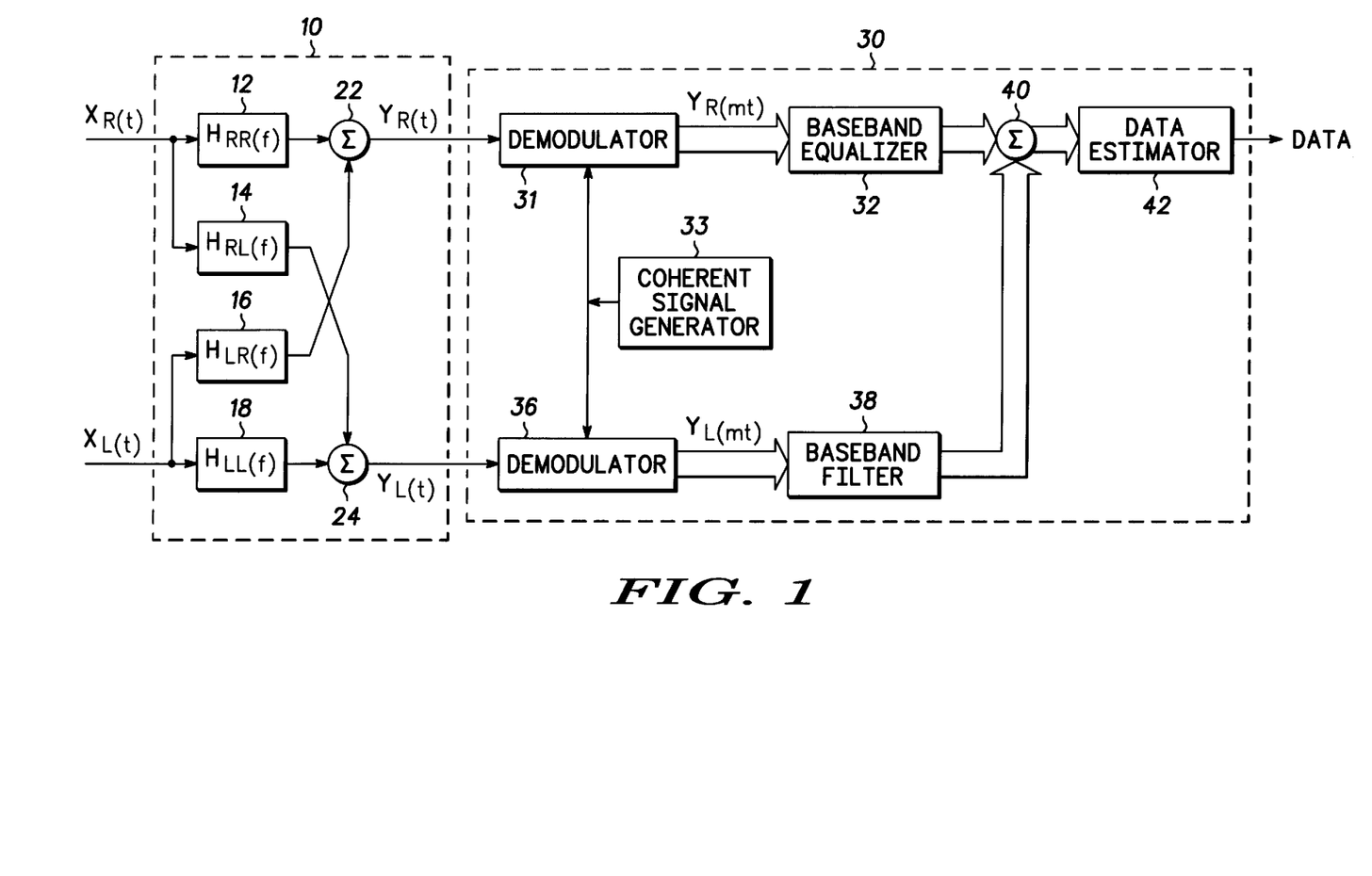
FIG. 1 is a simplified illustration of a crosspolarization channel model and a block diagram of a typical adaptive crosspolarization interference canceling (AXPIC) receiver.

FIG. 1 is a simplified illustration of a crosspolarization channel model 10 and a block diagram of a typical adaptive crosspolarization interference canceling (AXPIC) receiver 30. The information bearing signals are shown as $X_R(t)$ and $X_L(t)$. $X_R(t)$ represents the direct channel signal processed by the R-channel. $X_L(t)$ represents the crosspolarized channel signal processed by the L-channel. These information signals are provided to channel model 10. FIG. 1 shows one-half of a typical AXPIC receiver 30, i.e., the half that estimates the information contained in information bearing signal $X_R(t)$. An equivalent half of the receiver (not shown) is used to process the crosspolarized information bearing signal $X_L(t)$.

In channel model 10, filters 12, 14, 16 and 18 represent the channel. Each filter has an associated transfer function H(f) as shown. Transfer functions $H_{RL}(f)$ and $H_{LR}(f)$ determine the characteristics of the crosspolarization interference. Any depolarization at the antennas is grouped as a channel effect for the purposes of this description. Signal $Y_R(t)$ is the direct channel signal and the signal $Y_L(t)$ is the crosspolarized channel signal received at receiver 30. These received signals are respectively demodulated with a common recovered carrier in demodulators 31 and 36. Using coherent signal generator 33, the recovered carrier is phase locked to the carrier of the direct channel signal. The direct channel signal is filtered by an R-channel equalizer (baseband equalizer 32) while the crosspolarized channel signal is filtered by the L-channel filter (baseband filter 38). Baseband filter 38 constructs a crosspole interference cancellation signal. A cancellation signal provided by baseband filter 38 is combined with the baseband signal provided by baseband equalizer 32 in summer 40. Summer 40 provides an interference canceled version of the direct channel signal $Y_R(t)$ to data estimator 42. Data estimator 42 provides an estimate of the data from direct channel signal $Y_R(t)$. A similar data estimator as part of the receiver (not shown) for the L-channel data similarly provides an estimate of the data from crosspolarized channel signal $Y_L(t)$. In receiver 30, the data and error estimates are based on the symbol clock of the direct channel signal. As a result, receiver 30 provides for cancellation of crosspolarization interference for information bearing signals only when two polarizations have the same baud rate.

In receiver 30, the R-channel baseband equalizer 32 is typically a T-spaced filter structure. The cancellation filter, baseband filter 38, is also typically a T-spaced filter. Processing after the R-channel equalizer takes place at the baud rate of the direct channel signal. "T" is the baud rate of the direct channel signal.

Under ideal operating conditions, filter 38 creates a scaled replica of the crosspole interference, as seen at the output of equalizer 32. This replica of the crosspole interference is subtracted from the output of equalizer 32, and the crosspole interference is, at least in theory, completely removed. The interference cancellation technique of receiver 30 generally works well when the baud rates of the information signals $X_R(t)$ and $X_L(t)$ are equal. When the baud rates of the information signals are not equal, the interference cancellation technique of receiver 30 fails because the receiver's structure is based on the baud interval of the direct channel signal. Furthermore, even when the baud rate interval of the information bearing signals is the same, any timing skew existing in the channel or in the receiver, (e.g., in the cabling between the antenna and the receiver) causes receiver 30 to produce an inaccurate reconstruction of the interference signal. As a result, the interference canceling technique of receiver 30 again fails.

Thus what is needed are an interference canceling method and apparatus suitable for crosspolarized signals of unrelated baud rate intervals. What is also needed are an interference canceling method and apparatus suitable in crosspolarized systems that is unaffected by timing skews.

A discrete-time description of a system is used in the following problem definition and model describing the present invention. Although digital elements are described herein, analog structures are also suitable; the results are the same.

To formulate the problem, the modeling of two digital communications signals operating at different baud rates is described. One way of accommodating this situation is to develop a discrete-time model. Using this approach, the direct channel signal $X_R(t)$ and crosspolarized channel signal $X_L(t)$ are expressed as:

$$x_R(m) = a_{\lfloor \frac{m}{T} \rfloor} p_R\left[m - \left\lfloor \frac{m}{T} \right\rfloor T\right] + jb_{\lfloor \frac{m}{T} \rfloor} q_R\left[m - \left\lfloor \frac{m}{T} \right\rfloor T\right]$$

$$x_L(m) = \alpha_{\lfloor \frac{m+\eta}{T+\tau} \rfloor} p_L\left[m - \left\lfloor \frac{m}{T+\tau} \right\rfloor (T+\tau) + \eta\right] +$$

$$j\beta_{\lfloor \frac{m+\eta}{T+\tau} \rfloor} q_L\left[m - \left\lfloor \frac{m}{T+\tau} \right\rfloor (T+\tau) + \eta\right]$$

These baseband representations will be used throughout this description. The term "m" denotes the index of the smallest or base time increment $\Delta$. The baud interval "T" is an integer number of base time increments. The notation $\lfloor x \rfloor$ refers to the least integer value of "x". The parameters "a, b, $\alpha$, $\beta$" are independent identically distributed random variables. Each variable is selected from a set of possible values that defined the particular modulation format. The terms "p" and "q" are arbitrary pulse shapes which take on non-zero values over a baud interval. The subscripts "R" and "L" indicate the relationship to a given polarization channel. The term "$\tau$" may be an integer number of $\Delta$'s and is used to define the baud rate of the L-channel signal, $1/(T+\tau)$. Note that this formulation implies that the ratio of the baud rates of the direct and crosspolarized channel signals is related by an integer function, however this is not required. The term "$\eta$" is used to indicate an arbitrary starting time of the L-channel signal relative to the R-channel signal. It is assumed that carrier phase and symbol time of the R-channel signal (i.e., the direct channel signal) is known. Accordingly, no provision for a random phase and arbitrary starting time have been included in the equation for $X_R(t)$.

Case I—Time Aligned:

The crosspole interference is modeled as:

$$Y_R(m) = X_R(m) + \Gamma_{LR} X_L(m)$$

$$Y_L(m) = X_L(m) + \Gamma_{RL} X_R(m)$$

The crosspole interference is a scaled and phase shifted version of the orthogonal channel's signal. When sampling occurs after the demodulator, the signals at the input to the equalizer and crosspole filters are represented as:

$$Y_R(mT) = X_R(mT) + \Gamma_{LR} X_L(mT)$$

$$Y_L(mT) = X_L(mT) + \Gamma_{RL} X_R(mT)$$

As shown, a particular sampling instant of the direct channel signal has been selected. In this case, the first sample is taken at m=0 with samples following each T-seconds. Accounting for this sampling arrangement, assuming rectangular pulses, letting $\eta=0$ and the crosspole contributions the above equations become:

$$Y_R(mT) = a_m + jb_m + \Gamma_{LR}\left\{\alpha_{\lfloor \frac{mT}{T+\tau} \rfloor} + j\beta_{\lfloor \frac{mT}{T+\tau} \rfloor}\right\}$$

$$Y_L(mT) = \alpha_{\lfloor \frac{mT}{T+\tau} \rfloor} + j\beta_{\lfloor \frac{mT}{T+\tau} \rfloor} + \Gamma_{RL}\{a_m + jb_m\}$$

The direct channel signal information contained in $Y_R(mt)$ is contained in "a" and "b". With this simplistic channel model, no intersymbol interference (ISI) occurs. However, crosspole interference does exist. At the sampling instances this interference is contained in the appropriate samples of $\alpha$ and $\beta$. For this case, the tap coefficients of a T-spaced crosspole filter are adjusted to remove the interference. This is possible because $Y_L(t)$ is sampled such that the $\alpha$ and $\beta$ terms found in $Y_L(t)$ are appropriately time aligned with the $\alpha$ and $\beta$ terms found in $Y_R$. The term within the brackets of the $Y_R$ equation is the crosspole interference term. The $\alpha$ and $\beta$ terms of the $Y_L$ equation are a scaled version of these terms. Thus, signal terms corresponding to the crosspole interference found in the R-channel signal are available at the output of the L-channel.

Case II: Time misalignment.

In this example case, the crosspole interference for the R-channel crossing into the L-channel is the same as in Case I. The crosspole interference of the L-channel crossing into the R-channel is attenuated by $\Gamma_{RL}$ and time shifted by $\gamma$. Such a time shift, for example, occurs in typical receiver implementations. The sampled signals at the input to the equalizer and the canceller are represented as:

$$Y_R(mT) = X_R(mT) + \Gamma_{LR} X_L(mT + \gamma)$$

$$Y_L(mT) + X_L(mT) + \gamma_{RL} X_R(mT)$$

Under the same sampling conditions as in Case I, these equations reduce to:

$$Y_R(mT) = a_m + jb_m + \Gamma_{LR}\left\{\alpha_{\lfloor \frac{mT+\gamma}{T+\tau} \rfloor} + j\beta_{\lfloor \frac{mT+\gamma}{T+\tau} \rfloor}\right\}$$

$$Y_L(mT) = \alpha_{\lfloor \frac{mT}{T+\tau} \rfloor} + j\beta_{\lfloor \frac{mT}{T+\tau} \rfloor} + \Gamma_{RL}\{a_m + jb_m\}$$

In this case, a T-spaced crosspole cancellation filter does not compensate for the crosspole distortion unless $\gamma=nT$ and the cancellation filter is of adequate length. Otherwise, the proper version of the signal is not available. Thus, there is no cancellation of the interference.

Accordingly, the $\gamma$ second time shift should be compensated for. When $\gamma$ equals an integer multiple of T, the proper timing arrangement will be maintained (i.e., γ=nT). This is accomplished by a time alignment function. In effect, the sampling of the signal $Y_L(t)$ is adjusted to compensate for γ, and the sampled $Y_L(mT)$ signal becomes:

$$Y_L(mT) = \alpha \left[ \frac{mT+\zeta+\gamma}{T+\tau} \right] + j\beta \left[ \frac{mT+\zeta+\gamma}{T+\tau} \right] + \Gamma_{RL}\{a_m + jb_m\}$$

The proper timing arrangement is found by adjusting the term ζ such that ζ+γ=nT. This time arrangement allows the coefficients of the crosspole cancellation filter to be adjusted to a stationary solution while canceling the crosspole interference. This is possible because the α and β terms found in the sampled L-channel signal are properly time aligned within rT (r is an integer) seconds of the crosspole interference terms found in $Y_R(mt)$. When the time span of the crosspole interference canceling filter is long enough to accommodate an rT second time shift, cancellation occurs.

These examples illustrate operation of crosspole canceling techniques. However, time dispersion and differential dispersion have not been addressed. When there is a significant difference in the dispersion caused by $H_{LL}$ relative to the dispersion caused by $H_{LR}$, the interference canceling performance of these techniques may suffer. Fortunately, crosspole channels typically suffer minimal amounts of differential dispersion. See E. Hendrix, et al, "Multigigabit Transmission through Rain in a Dual Polarization Frequency Reuse System: An Experimental Study," IEEE Trans. Commun., Vol. COM-41, No. 12, Dec., 1993, pp. 1830–1837. Accordingly, for channels of interest, these techniques significantly mitigate crosspole interference.

Figure 2:
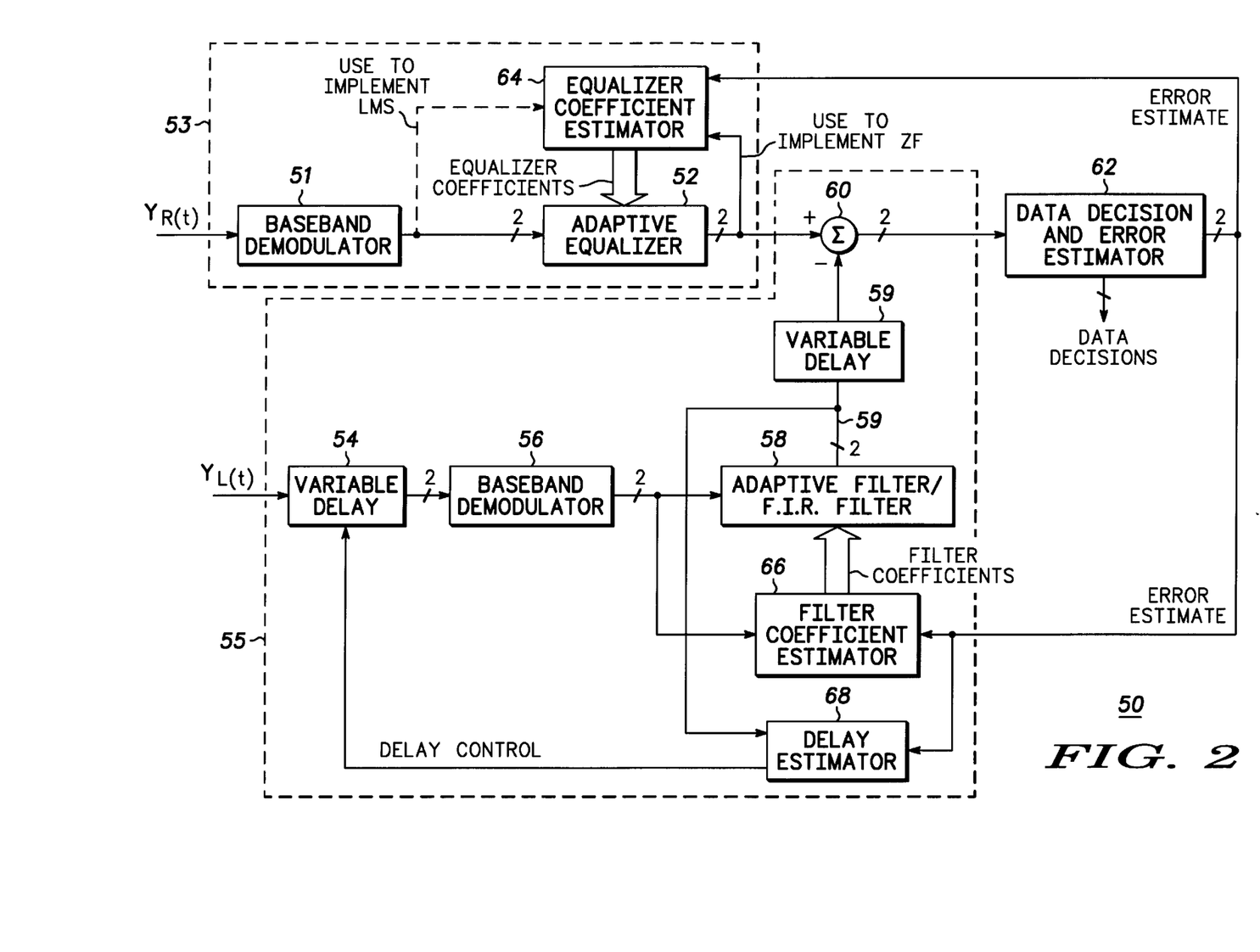
FIG. 2 shows a simplified block diagram of a modified adaptive crosspole interference cancellation (MAXPIC) receiver in accordance with a preferred embodiment of the present invention.

FIG. 2 shows a simplified block diagram of a modified adaptive crosspole interference cancellation (MAXPIC) receiver 50 in accordance with a preferred embodiment of the present invention. Receiver 50 includes direct channel receiver portion 53 for receiving the direct channel signal $Y_R(t)$. Receiver 50 also includes crosspolarization interference canceling portion 55 for receiving the crosspolarized channel signal $Y_L(t)$ and for canceling crosspolarization interference. Receiver 50 also includes data decision and error estimator portion 62 for providing data and error estimates.

In this embodiment of the present invention, a variable delay is used to time-align the received crosspolarized channel signal $Y_L(t)$ with the crosspolarization interference contained in the direct channel signal $Y_R(t)$. The information signals $Y_R(t)$ and $Y_L(t)$ are the inputs to receiver 50 received through the channel as discussed above. Desirably, the direct channel signal $Y_R(t)$ and the crosspolarization channel signal $Y_L(t)$ are orthogonally polarized signals preferably received through a dual polarization frequency reuse channel.

Direct channel receiver portion 53 comprises baseband demodulator 51, adaptive equalizer 52 and equalizer coefficient estimator 64. Baseband demodulator 51 accepts the direct channel signal $Y_R(t)$ and provides complex (I and Q) output signals to adaptive equalizer 52. Adaptive equalizer 52 receives these unequalized complex baseband signals from baseband demodulator 51 and also receives tap coefficients (weights) from coefficient estimator 64. Adaptive equalizer 52 provides equalized complex baseband I and Q output signals. One purpose of adaptive equalizer 52 is to minimize the distortions caused by the direct channel frequency response. Preferably, adaptive equalizer 52 implements an inverse function of the frequency response of the direct channel $H_{RR}(f)$ (see FIG. 1).

Direct channel equalizer coefficient estimator 64 calculates filter coefficients for adaptive equalizer 52. Direct channel equalizer coefficient estimator 64 receives direct channel complex baseband data from either the output of baseband demodulator 51 or the output of adaptive equalizer 52 depending on whether the adaptive algorithm used by coefficient estimator 64 is a Least Mean Square (LMS) or Zero Forcing (ZF) algorithm. Other algorithms are also suitable for the present invention. The direct channel complex baseband data is correlated with the complex error received from data decision and error estimating portion 62 (discussed below) to calculate the filter coefficients which are provided to adaptive equalizer 52.

Crosspolarization interference canceling portion 55 of receiver 50 includes variable delay element 54, baseband demodulator 56, adaptive filter 58, filter coefficient estimator 66, delay estimator 68 and summer 60. Variable delay element 54 receives the crosspolarized channel signal $Y_L(t)$, and a delay control signal. Variable delay element 54 provides a delayed version of the input $Y_L(t+\tau)$. In this embodiment of the present invention, variable delay element 54 time-aligns the received crosspolarized channel signal $Y_L(t)$ with the crosspolarization distortion contained in the received direct channel signal $Y_R(t)$.

Baseband demodulator 56 accepts the delayed crosspolarized signal input $Y_L(t+\tau)$ from variable delay element 54 and provides complex (I and Q) baseband output signals. Baseband demodulator 56 is preferably identical to baseband demodulator 51 and preferably uses the same carrier reference. Adaptive filter 58 receives the delayed and demodulated complex baseband signals from baseband demodulator 56. Adaptive filter 58 also receives a set of filter coefficients from filter coefficient estimator 66. Adaptive filter 58 provides a filtered version of its input. Among other things, adaptive filter 58 attempts to match the crosspolarized channel signal that has coupled into the direct channel and has been processed by adaptive equalizer 52. Preferably, adaptive filter 58 matches the channel response $H_{LR}(f)$ (See FIG. 1).

Filter coefficient estimator 66 calculates filter coefficients for adaptive filter 58. Filter coefficient estimator 66 receives the demodulated complex baseband signals from baseband demodulator 56 and complex error signals from data decision and error estimating portion 62 (discussed below). These signals are correlated to calculate the filter coefficients provided to adaptive filter 58.

Delay estimator 68 receives the filtered complex baseband signals from adaptive filter 58 and complex error signals calculated in data decision and error estimating portion 62. Delay estimator 68 uses these signals to determine the appropriate delay to time-align the received crosspolarized channel signal $Y_L(t)$ with the crosspolarization distortion contained in the received direct channel signal $Y_R(t)$. The delay, for example, is calculated by correlating the error estimate with the crosspolarization canceling signal using a constrained adaptive algorithm. Other algorithms may also be suitable. Accordingly, delay estimator 68 provides the appropriate delay control signal to variable delay element 54.

In receiver 50, although delay element 54 is shown before baseband demodulator 56, a suitable delay element may instead be located after baseband demodulator 56 or at the output of adaptive filter 58 shown as delay element 59.

Summer 60 receives the equalized direct channel complex baseband signal from adaptive equalizer 52 of direct channel receiver portion 53 and subtracts the delayed and filtered crosspolarized complex baseband signal received from adaptive filter 58. Summer 60 provides the direct channel signal with the cross polarization interference (the cross channel component) canceled.

Data decision and error estimating portion 62 receives the direct channel signal from summer 60 and makes data decisions by comparing the received signal with data decision thresholds. These thresholds are typically based on modulation format. These data decisions are compared to the input and a complex error signal is generated by taking the difference between the received signal and the data decision. The data decisions and complex error are provided as outputs. In general, the specific implementation of data decision and error estimating portion 62 is modulation dependent. The data decisions represent estimates of the information transmitted over the direct channel.

Figure 3:
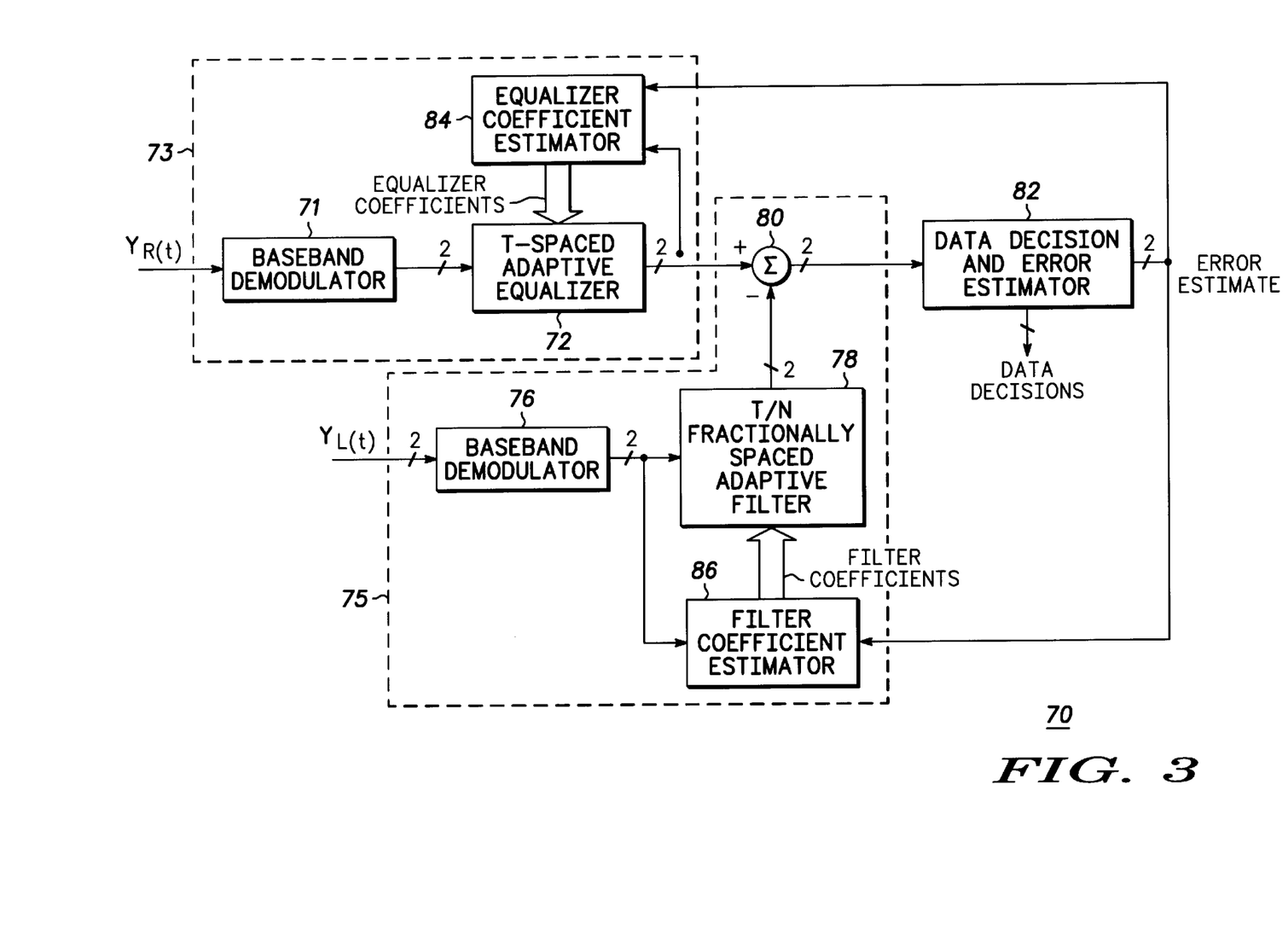
FIG. 3 shows a simplified block diagram of a modified adaptive crosspole interference cancellation (MAXPIC) receiver in accordance with another preferred embodiment of the present invention.

FIG. 3 shows a simplified block diagram of modified adaptive crosspole interference cancellation (MAXPIC) receiver 70 in accordance with another preferred embodiment of the present invention. Receiver 70 includes direct channel receiver portion 73 for receiving the direct channel signal $Y_R(t)$. Receiver 70 also includes crosspolarization canceling portion 75 for receiving crosspolarization channel signal $Y_L(t)$ and for canceling crosspolarization interference. Receiver 70 also includes data decision and error estimator portion 82 for providing data and error estimates. Direct channel receiver portion 73 of receiver 70 comprises baseband demodulator 71, adaptive equalizer 72 and equalizer coefficient estimator 84. Crosspolarization canceling portion 75 of receiver 70 comprises baseband demodulator 76, adaptive filter 78, filter coefficient estimator 86 and summer 80.

In this embodiment of the present invention, baseband demodulators 71, 76 and data decision and error estimator portion 82 of receiver 70 are preferably similar to baseband demodulators 51, 56 and data decision and error estimator portion 62 of receiver 50 (FIG. 2), respectively. In this embodiment of the present invention, fractionally spaced filter structures of adaptive filter 78 implement the delay functions of variable delay element 54 of receiver 50 (FIG. 2). The fractionally spaced filter structures simplify the task of crosspolarization canceling portion 75 by combining the time-alignment and filtering functions.

In this embodiment, adaptive equalizer 72 is preferably a T-spaced adaptive filter where "T" is the direct channel signal symbol period (i.e., baud rate interval). Adaptive equalizer 72 receives unequalized complex baseband inputs and tap coefficients (weights) and produces equalized complex baseband I and Q outputs.

Adaptive filter 78 receives the complex baseband crosspolarization channel signal from baseband demodulator 76 and a set of filter coefficients (or weights) from filter coefficient estimator 86 and provides a filtered version of the input. Among other things, adaptive filter 78 desirably matches the crosspolarized channel signal that has coupled into the direct channel and has been processed by the adaptive equalizer 72. Preferably, adaptive filter 78 matches the channel response $H_{LR}(f)$ (See FIG. 1). In this embodiment, adaptive filter 78 is preferably a T/N fractionally spaced adaptive filter where T is the direct channel symbol period. In the preferred embodiment N=2, although other values are also suitable.

Adaptive filter 78 synthesizes the appropriate delay by correlating error estimates with received baseband data. The maximum tap spacing that allows for time delay correction is T/2. The overall delay provided by the filter structure should be sufficiently long to accommodate the maximum differential delay experienced between the two crosspolarized channels.

In receiver 70, summer 80, data decision and error estimating portion 82, direct channel adaptive equalizer 72, equalizer coefficient estimator 84, and baseband demodulators 71 and 76 perform the same function as summer 60, data decision and error estimating portion 62, adaptive equalizer 52, direct channel equalizer coefficient estimator 64, and baseband demodulators 51 and 56 of receiver 50 (FIG. 2) respectively.

Figure 4:
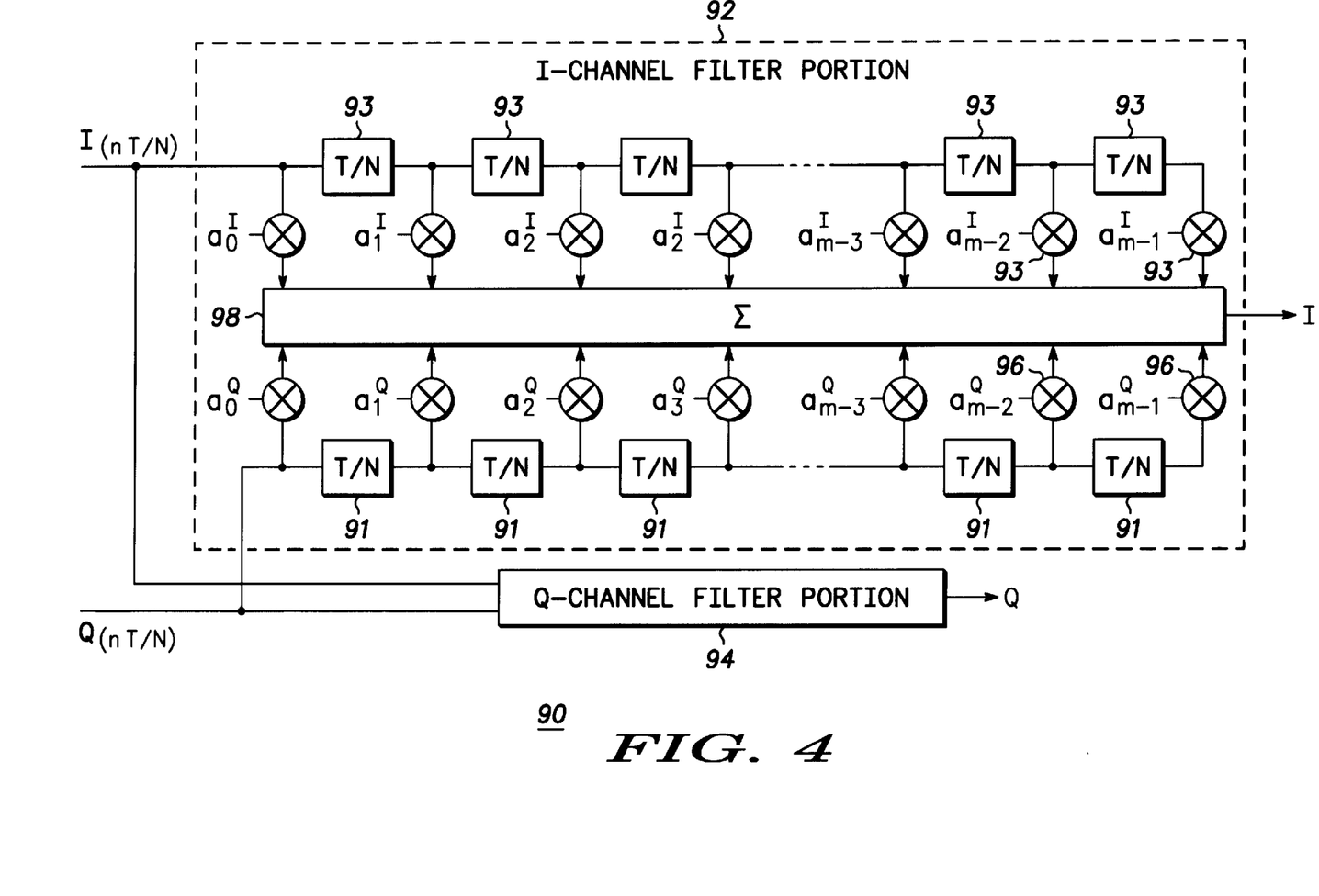
FIG. 4 illustrates a simplified functional diagram of a complex finite impulse response (FIR) filter structure suitable for use in a preferred embodiment of the present invention.

FIG. 4 illustrates a simplified functional diagram of a complex finite impulse response (FIR) filter 90 suitable for use in a preferred embodiment of the present invention. Filter 90 includes an I-channel portion 92 and a Q-channel portion 94. I-channel portion 92 includes "M−1" delay elements 93 and "M−1" delay elements 91, each with a delay of T/N and each forming tapped delay lines. Delay elements 93 store samples of the I-channel data sampled at a rate equal to N/T, and shifts the data along an M tap delay line. Delay elements 91 process the Q-channel data in a similar fashion. T is the symbol period, and the equalizer length is MT/N. Delay elements 91 and 93 may, for example, be either analog sample and hold circuits or digital shift registers. Each tap output is scaled by a coefficient in either multipliers 95 or 96. The outputs of multipliers 95 and 96 are combined in summer 98 to form the I-channel output. Only the I-channel side of the complex filter is shown. Q-channel portion 94 is preferably identical to the I-channel side as shown (i.e. having it's own tapped delay line and tap) or it can share the tapped signals and apply different tap weights.

In I-channel portion 92, multipliers 95 weight each of the delayed I-channel signals, and multipliers 96 weight the delayed Q-channel signals. Each weight is preferably unique to each tap and is denoted $a_i^I$ for the taps that weight delayed I-channel signals and $a_i^Q$ for the taps that weight delayed Q-channel signals (i=0 to M−1). The outputs of the 2M multipliers 95, 96 are summed together to form the I-channel output of filter 90.

Similarly, in Q-channel portion 94, multipliers weight each of the delayed I-channel signals and each of the delayed Q-channel signals. Each weight is preferably unique to each tap and is denoted $b_i^I$ for the taps that weight delayed I-channel signals and $b_i^Q$ for the taps that weight delayed Q-channel signals (i=0 to M−1). The outputs of the 2M multipliers are summed together to form the Q-channel output of filter 90. T is the baud rate interval of the direct channel signal, N is an integer greater than one, MT/N is greater than or equal to the maximum differential delay between the crosspolarized and direct channels, and M is a positive integer. The number of taps is system dependent and is typically less than two-hundred.

To select the number of taps, the differential timing delay between the direct channel signal and crosspolarized channel signal is taken into account. In general, the cancellation filter is lengthened by the expected amount of differential delay.

When used in accordance with a preferred embodiment of the present invention, finite impulse response filter 90 implements an impulse response with length TM/N. With suitable tap weights, filter 90 provides the desired transfer functions or inverse transfer functions used in the preferred embodiments of the present invention illustrated in FIG. 2 and FIG. 3.

In summary, the operation of the receiver of the preferred embodiments of the present invention partially reconstructs the crosspolarization interference. The reconstructed signal is subtracted from the direct channel signal thereby removing the interference. The present invention does not necessary completely reconstruct the crosspolarization interference, but reconstructs the interfering signal at the same sample instant where a data decision in made.

Thus, a receiver that cancels crosspolarization interference caused by the transmission of crosspolarized signals of unrelated baud rates through a dual polarization frequency reuse channel has been described. The receiver overcomes specific problems and accomplishes certain advantages relative to prior art methods and mechanisms. The improvements over known technology are significant.

The receiver of the present invention is applicable to any digital satellite or terrestrial microwave system. Furthermore, receiver of the present invention enables the doubling of the channel capacity of digital satellite or terrestrial microwave systems without increasing bandwidth requirement. The present invention allows for the use of crosspolarization frequency reuse feasible in many operational environments. For example, in direct satellite television (DDS-TV), the number of channels supported by a satellite may double. The present invention is also applicable to satellite communication systems that provide voice, interactive video, HDTV and data transport.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A receiver for canceling crosspolarization interference caused by transmission of crosspolarized signals of unrelated baud rates through a dual polarization frequency reuse channel, said receiver comprising:

a direct channel portion for receiving a direct channel signal of a first baud rate through said dual polarization frequency reuse channel, said direct channel signal having a direct channel component and a cross channel interference component, said direct channel portion providing an equalized output signal;

a crosspolarization interference canceling portion receiving a cross channel signal of a second baud rate through said dual polarization frequency reuse channel, said crosspolarization interference canceling portion providing a combined output signal substantially without crosspolarization interference; and a data decision and error estimating portion receiving said combined output signal and providing data decisions based on said combined output signal, said data decision and error estimating portion providing an error estimate based on said combined output signal and a threshold value, said crosspolarization interference canceling portion including a variable delay element for delaying said cross channel signal based a delay estimate signal, said crosspolarization interference canceling portion including a cross channel demodulator for demodulating said cross channel signal;

said crosspolarization interference canceling portion including a cross channel adaptive filter providing a cancellation signal based on adaptive filter coefficients and a delayed and demodulated version of said cross channel signal provided through the variable delay element and the cross channel demodulator, said adaptive filter coefficients based on said error estimate and the delayed cross channel signal;

said crosspolarization interference canceling portion including a delay estimator providing said delay estimate signal to said variable delay element, said delay estimate signal based on said error estimate and said cancellation signal, said crosspolarization interference canceling portion including a summer for combining the cancellation signal with said equalized output signal whereby said cross channel interference component is canceled from said direct channel signal.

2. A receiver as claimed in claim 1 wherein said data decision and error estimating portion provides feedback signals to said direct channel portion.

3. A receiver as claimed in claim 2 wherein said cross channel interference signal represents an inverse function of said crosspolarization interference.

4. A receiver as claimed in claim 3 wherein said cross channel adaptive filter includes a finite impulse response filter (FIR), said FIR filter substantially matching channel characteristics of said dual polarization frequency reuse channel.

5. A receiver as claimed in claim 4 wherein said FIR filter comprises a fractionally spaced adaptive filter having a tapped delay line with taps spaced apart by a tap spacing that is a function of said first baud rate.

6. A receiver as claimed in claim 5 wherein said data decision and error estimating portion provides said error estimate by comparing said combined output signal with data decision thresholds, said data decision thresholds being based on a modulation format of said dual polarization frequency reuse channel.

7. A receiver for canceling crosspolarization interference caused by transmission of crosspolarized signals through a dual polarization frequency reuse channel, said receiver comprising:

a direct channel receiver portion receiving a direct channel signal of a first baud rate through said dual polarization frequency reuse channel to provide complex direct channel equalized signals, said direct channel signal including crosspolarization interference;

a data decision and error estimating portion; and a crosspolarization interference canceling portion, said crosspolarization interference canceling portion comprising:

a cross channel baseband demodulator receiving through said dual polarization frequency reuse channel, a crosspolarized channel signal of a second baud rate, said cross channel baseband demodulator providing complex cross channel baseband signals;

a cross channel adaptive filter receiving said complex cross channel baseband signals and providing complex interference canceling signals based on cross channel filter coefficients;

a cross channel coefficient estimator for calculating said cross channel filter coefficients for said cross channel adaptive filter based on said complex cross channel baseband signals and a complex error signal;

a summer adding said complex interference canceling signals to said complex direct channel equalized signals to provide output direct channel signals substantially without crosspolarization interference; and a variable delay element delaying said complex interference canceling signals by an amount based on said complex interference canceling signals and said complex error signal, said complex error signal based on said output direct channel signals and threshold values, said complex error signal provided by said data decision and error estimating portion.

8. A receiver as claimed in claim 7 wherein said complex interference canceling signals represent an inverse function of said crosspolarization interference.

9. A receiver as claimed in claim 8 wherein said variable delay element includes means for delaying said crosspolarized channel signal by a time delay to time-align said crosspolarization interference of said complex direct channel equalized signals with said complex interference canceling signals and wherein said crosspolarization interference canceling portion further comprises a delay estimator for determining said time delay based on said complex error signal and said complex cross channel baseband signals.

10. A receiver as claimed in claim 9 wherein said cross channel adaptive filter comprises a finite impulse response filter (FIR), said FIR filter matching channel characteristics of said dual polarization frequency reuse channel.

11. A receiver as claimed in claim 10 wherein said FIR filter comprises a fractionally spaced adaptive filter having a tapped delay line with taps spaced apart by a tap spacing that is a function of said first baud rate.

12. A receiver as claimed in claim 11 wherein said data decision and error estimating portion provides said complex error signal by comparing said output direct channel signals with data decision thresholds, said data decision thresholds being based on a modulation format of said dual polarization frequency reuse channel.

13. A receiver as claimed in claim 12 wherein said direct channel receiver portion comprises:

a direct channel baseband demodulator for receiving said direct channel signal, said direct channel baseband demodulator providing complex direct channel baseband signals;

a direct channel adaptive equalizer for receiving said complex direct channel baseband signals from said direct channel baseband demodulator and providing said complex direct channel equalized signals based on direct channel equalizer coefficients; and a direct channel coefficient estimator for calculating said direct channel equalizer coefficients for said direct channel adaptive equalizer based on said complex error signal, said direct channel adaptive equalizer implementing a transfer function that is inverse to frequency response characteristics of a direct channel portion of said dual polarization frequency reuse channel.

14. A receiver as claimed in claim 13 wherein said direct channel coefficient estimator calculates said direct channel equalizer coefficients by correlating said complex direct channel baseband signals with said complex error signal.

15. A receiver as claimed in claim 14 wherein said direct channel coefficient estimator calculates said direct channel equalizer coefficients by correlating said complex direct channel baseband signals with said complex error signal, wherein said direct channel coefficient estimator uses a zero-forcing algorithm to correlate said complex direct channel baseband signals with said complex error signal, said zero-forcing algorithm using said complex direct channel equalized signals.

16. A receiver as claimed in claim 14 wherein said direct channel coefficient estimator calculates said direct channel equalizer coefficients by correlating said complex direct channel baseband signals with said complex error signal, wherein said direct channel coefficient estimator uses a least-mean-square algorithm to correlate said complex direct channel baseband signals with said complex error signal, said least-mean-square algorithm using said complex direct channel baseband signals.

17. A receiver as claimed in claim 14 wherein said direct channel signal and said crosspolarized channel signal are orthogonally polarized and of different baud rate intervals.

18. A method of canceling crosspolarization interference from a direct channel signal of a first baud rate received through a dual polarization frequency reuse channel, said direct channel signal having a direct channel component and a cross channel interference component, said method comprising the steps of:

receiving a cross channel signal of a second baud rate through said dual polarization frequency reuse channel;

filtering a demodulated version of said cross channel signal to produce a cancellation signal, the filtering time-aligning said cross channel signal with said cross channel interference component by delaying said cross channel signal an amount based on said cancellation signal and an output error signal; and combining said direct channel signal with said cancellation signal to provide an output signal substantially without crosspolarization interference.

19. A method as claimed in claim 18 wherein the time-aligning step further comprises providing a time delay with a filter to time-align said cross channel signal with said direct channel signal, said filter matching channel characteristics of said dual polarization frequency reuse channel.

20. A method as claimed in claim 19 wherein the time-aligning step, said filter includes a finite impulse response (FIR) filter that comprises a fractionally spaced adaptive filter having a tapped delay line with taps spaced apart by a tap spacing that is a function of a baud rate interval of said direct channel signal.

* * * * *